March 31, 1953 — EDMOND-PIERRE DESBRUERES — 2,633,175
ELEMENT FOR FACILITATING THE ASSEMBLY
BY BOLTS OF CONSTRUCTIONAL MEMBERS
Filed April 2, 1947 — 2 SHEETS—SHEET 1

Inventor:
Edmond-Pierre Desbrueres

March 31, 1953 EDMOND-PIERRE DESBRUERES 2,633,175
ELEMENT FOR FACILITATING THE ASSEMBLY
BY BOLTS OF CONSTRUCTIONAL MEMBERS
Filed April 2, 1947 2 SHEETS—SHEET 2

Patented Mar. 31, 1953

2,633,175

UNITED STATES PATENT OFFICE 2,633,175

ELEMENT FOR FACILITATING THE ASSEMBLY BY BOLTS OF CONSTRUCTIONAL MEMBERS

Edmond-Pierre Desbruères, Paris, France

Application April 2, 1947, Serial No. 739,022
In France August 29, 1941

Section 1, Public Law 690, August 8, 1946
Patent expires August 29, 1961

9 Claims. (Cl. 151—41.76)

Difficulties are known which are met with in the assembly of members by bolts, in certain constructions such as aeronautical construction, in arranging the bolts in place, for example, if one of the members has a side which is difficult of access.

One object of the present invention is to provide an element which is fixed in advance on one of the members to be assembled and which permits these difficulties to be overcome.

According to this invention, the said element is composed of a band or strip of any desired length and which, at convenient distances, is formed with holes in which are held, with slight transverse, longitudinal and axial play with respect to the band or strip, but with limited turning movement, collar nuts of a usual commercial type, which are held by their collars, or extensions of the latter, in the holes and, on assembly, when the bolts are screwed into them, are applied directly by the collars or their extensions against the surface of the member to be assembled, on which the element has been fixed, in order to ensure locking without the aid of any other member.

The band or strip, carrying the nuts, is fixed by screws, rivets, solder, or any other means on one of the members to be assembled, for example, at a suitable moment in the course of the construction on the side of the member which will not remain accessible when in place. In order then to carry out the assembly, the bolts are screwed into the nuts, which does not lead to any difficulty because of the ability of the said nuts to move transversely, longitudinally and axially.

The nuts may be simple nuts or safety nuts, but necessarily must have at the bottom plain collars, or collars comprising extensions in the form of small sleeves that can be folded back in order to fix the nuts by locking. One of the great advantages of the invention consists in that there can thus be utilised nuts of current commercial types.

The band or strip can be constructed of any suitable material; for example, of flexible material which allows it to be adapted to the curvature of the member on which it is fixed.

The accompanying drawings show, by way of example, two constructional forms of the invention.

Figure 1:
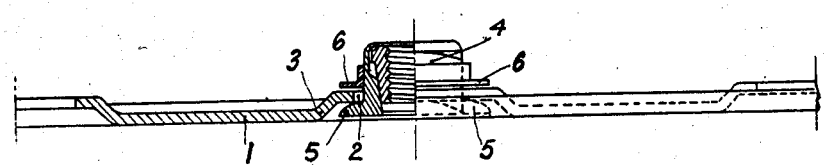
Figure 1 is a longitudinal elevation partly in section of a construction in which square collar nuts are used.

Any suitable forms of nut may be used in carrying out this invention but it is preferred to make use of self-locking or lock nuts. In the drawings lock nuts are shown of the type which comprise an internally threaded inner part which is externally tapered and is split longitudinally and an outer part which is formed with an internal taper corresponding to the taper of the inner part and which is provided with a rim or flange for retaining the inner part in position. It is to be understood, however, that the invention is not limited to the use of any particular forms of nuts.

Figure 2:
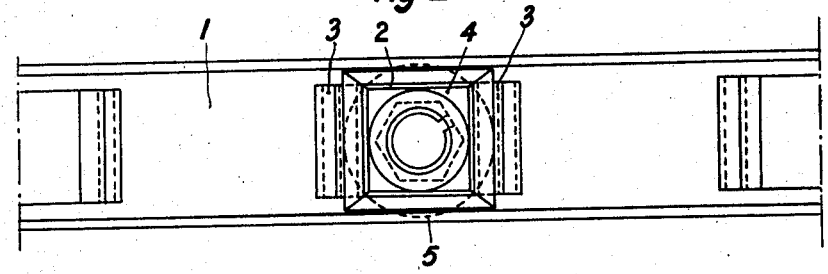
Figure 2 is a plan view of the construction shown in Figure 1.
Figure 6:
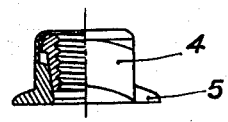
Figure 6 shows, half in elevation and half in section, the nut used in this first construction, which nut is an automatic locking safety nut made in two parts.
Figure 7:
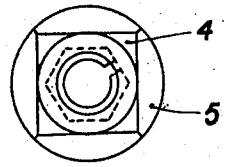
Figure 7 shows the nut in plan view.
Figure 8:
Figures 8 and 9 show respectively in sectional elevation and in plan view, an annular plate member used in this construction.
Figure 9:
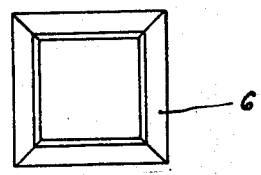
Figure 3:
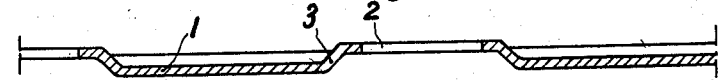
Figures 3, 4 and 5 are respectively a longitudinal vertical section, a plan view and a section on the line A—A in Figure 4 of the band or strip used in this construction.
Figure 4:
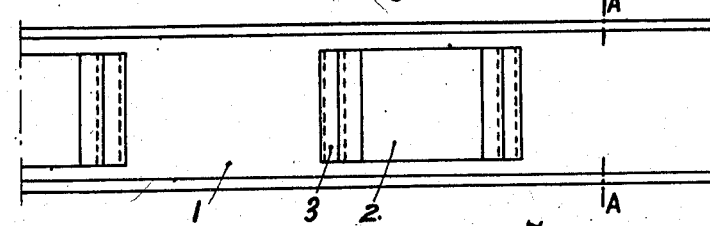
Figure 5:
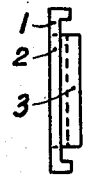
Figure 10:
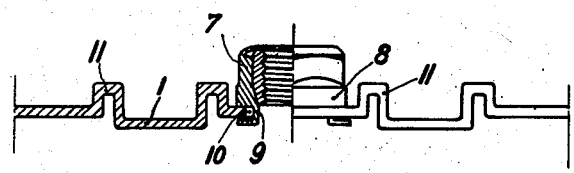
Figure 10 is a longitudinal elevation, partly in section of a second form of construction, in which hexagonal safety nuts, having collars in the form of extensions consisting of locking collars, are used.
Figure 11:
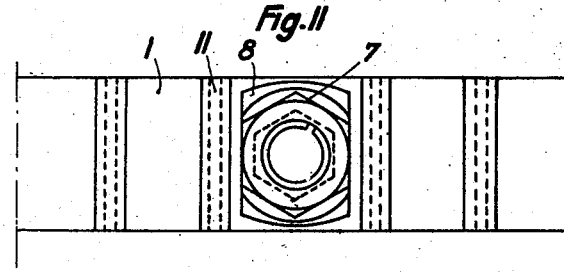
Figure 11 is a plan view of the construction of Figure 10.
Figure 12:
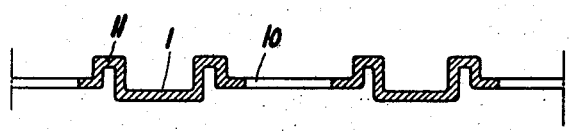
Figure 12 is a sectional elevation of the band or strip.
Figure 13:
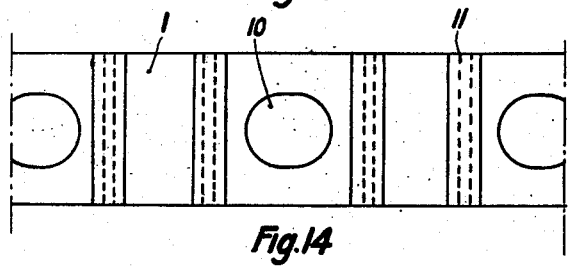
Figure 13 is a plan view of the band or strip.
Figure 14:
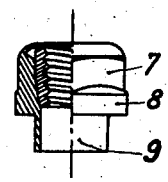
Figure 14 is a view, partly in section, of one of the nuts.
Figure 15:
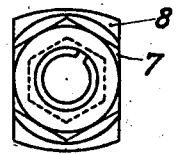
Figure 15 is a plan view of the nut.

The element comprises a band or strip 1 of light metal, in which square holes 2 are formed at suitable distances. The edges 3 of the holes 2 on two opposite ends are slightly raised and inclined as shown in Fig. 3. Into each of the holes a square nut 4 is introduced, the nut having a collar 5 and being of a section which is slightly less than that of the hole 2, so that the nut can be moved slightly transversely and longitudinally with respect to the strip 1. If so desired, the holes 2 may be oblong or rectangular. In any case, the section of the hole 2 with respect to that of the nut 4 must be such that should the nut tend to turn, its vertical edges abut against the edges of the hole, which prevents the nut from further turning. Once the nut is introduced into the hole so that its collar 5 is lodged in the inclined edges of the hole (Figures 1 and 2), there is mounted on it in a frictional manner from the other side of the strip 1, an annular plate 6 of angular section which may be made of any suitable material and which is formed with a square hole of such dimensions that the plate makes a firm wedging engagement with the nut 4. The nut is thus fixed in the hole 2 without being able to turn, but it is capable of slight transverse and longitudinal displacement with respect to the strip 1. As the edges of the hole are arranged with slight play between the collar 5 of the nut and the plate 6, this also allows the nut to tilt slightly relatively to the direction of the axis of the hole 2.

The strip 1 may be fixed, for example as mentioned above, on what will be the inaccessible face, of one of the members to be assembled, so that the nuts are opposite the holes formed in that member in order to receive the bolts. It will be understood that the nuts engage directly on the surface of the said member in such a manner that on assembly, when the bolts are screwed up, the clamping is effected by the collar of the nut engaging the member directly without the intermediary of any other member. This allows perfect security and tightness to be obtained which would be impossible to realise otherwise. The slight movability of the nuts in the transverse and longitudinal directions with respect to the strip allows the bolts to be inserted in place without any difficulty, each nut being easily aligned to the axis of the corresponding bolt. Moreover, the axial tilting mentioned above permits the nut to move so that it can take up its correct axial position with respect to that of the bolt without jamming. This ensures the proper engagement of the collar against the assembled member.

The element shown in Figures 10 to 15 is similar to that shown in Figs. 1 to 9. The nuts 7 used in this construction are again lock nuts, the collars 8 of which have extensions 9 in the form of small sleeves or collars, each of a diameter a little smaller than that of the nut, see Figure 14. The extension 9 of the nut is introduced into the corresponding hole 10 in the strip 1, which hole may be circular but is preferably slightly oval, see Figure 13. The smallest dimension of the hole is a little larger than the diameter of the small collar 9 and the diameter of the body of the nut is greater than the greatest dimension of the hole 10. The nut is fixed on the strip 1 by folding the small collar 9 out and back towards the face of the strip on the side opposite to the nut, Figure 10. The collar 8 is of elongated form so that when the nut tends to turn, its ends abut against projecting ribs 11 which are provided on the strip 1 on each side of the hole at suitable distances from the latter, so that the turning of the nut is prevented. On the other hand, the nut can have slight transverse and longitudinal movements with respect to the strip, as well as a slight axial or tilting movement, because the strip is only held by a slight friction between the body of the collar and the folded back small collar 9, which prevents the nut from being separated from the strip while allowing it the necessary liberty of movement.

This element is used in a similar manner to the one described with reference to Figures 1 to 9 described. The folded back small collar 9 of the nut bears directly on the assembled member on which the strip was fixed.

The invention is not limited to the constructional forms described above and can be modified within the principles referred to above as set forth in the appended claims.

I claim:

1. A device for facilitating the positioning of bolts in the assembly of constructional parts, the said device comprising in combination, a strip to be secured to one of the parts to be assembled; at least one angular hole provided in said strip; an angular nut passing through said hole with slight play transversally and longitudinally of said strip, the said nut having a dimension relatively to said hole so as to have a movement of rotation limited by engagement of the peripheral edges of the nut by the peripheral wall of said hole; a collar provided on said nut at one end thereof; and a flange member supported only by said nut and held on said nut by friction, the said collar and flange member extending on opposite faces of said strip and being spaced from each other so as to permit slight axial play and slight tilting of said nut relatively to the axis of said hole.

2. A device for facilitating the positioning of bolts in the assembly of constructional parts, the said device comprising in combination, a strip to be secured to one of the parts to be assembled; at least one hole provided in said strip; a nut passing through said hole with slight play in all directions in the plane of said strip and with a limited freedom of rotation about its axis; a collar provided on said nut on one end thereof; and attaching means frictionally mounted only on said nut and cooperating with said strip in such a manner as to hold said nut attached to said strip with a slight play in axial direction.

3. A device for facilitating the positioning of bolts in the assembly of constructional parts comprising, in combination, a strip to be secured to one of the parts to be assembled and provided with at least one non-circular hole; a non-circular nut arranged in said hole and being of such a size with respect to said hole that said nut has a play in all directions, but is prevented from free turning by engagement of said nut with the edges of said hole; means on said nut for limiting its movement in one direction along its axis; and means frictionally mounted on said nut for adjustably limiting its movement in the other direction along its axis.

4. A device for facilitating the positioning of bolts in the assembly of constructional parts comprising, in combination, a strip to be secured to one of the parts to be assembled and provided with at least one non-circular hole; a non-circular nut arranged in said hole and being of such a size with respect to said hole that said nut may tilt in all directions but is prevented from free turning by engagement of said nut with the edges of said hole; a collar mounted at one end of said nut for limiting its movement in one direction along its axis; and means frictionally mounted on said nut for adjustably limiting its movement in the other direction along its axis.

5. A device for facilitating the positioning of bolts in the assembly of constructional parts comprising, in combination, a strip to be secured to one of the parts to be assembled and provided with at least one non-circular hole; a non-circular nut arranged in said hole and being of such a size with respect to said hole that said nut has a play in all directions but is prevented from free turning by engagement of said nut with the edges of said hole; a collar mounted at one end of said nut for limiting its movement in one direction along its axis; and means on said nut for adjustably limiting its movement in the other direction along its axis, said adjustable limiting means comprising an element pressed on the outer surface of said nut and having a projecting portion adapted to engage said strip, the said element being movable along the length of said nut so as to adjust the amount of axial movement of said nut with respect to said strip.

6. A device for facilitating the positioning of bolts in the assembly of constructional parts comprising, in combination, a strip to be secured to one of the parts to be assembled and provided with at least one non-circular hole; a non-circular nut arranged in said hole and being of such a size with respect to said hole that said nut may tilt in all directions with respect to said strip but is prevented from free turning by engagement of said nut with the edges of said hole; a collar mounted at one end of said nut for limiting its movement in one direction along its axis; and means on said nut for adjustably limiting its movement in the other direction along its axis, said adjustable limiting means comprising an element having an opening therein shaped so as to mate with said nut, pressed on the outer surface of said nut and having a projecting portion extending completely around the periphery of said nut and adapted to engage said strip, the said element being movable along the length of said nut so as to adjust the amount of axial movement of said nut with respect to said strip.

7. A device for facilitating the positioning of bolts in the assembly of constructional parts, comprising, in combination, a strip to be secured to one of the parts to be assembled and provided with at least one non-circular hole; a non-circular nut arranged in said hole and being of such a size with respect to said hole that said nut has a slight play in all directions with respect to said strip but is prevented from free turning by engagement of said nut with the edge of said hole; a first projection located on said nut so as to engage one side of said strip; and a second projection frictionally mounted on said nut so as to engage the other side of said strip and so as to be adjustable along the axis of said nut.

8. A device for facilitating the positioning of bolts in the assembly of constructional parts comprising, in combination, a strip to be secured to one of the parts to be assembled, said strip being formed with at least one opening passing therethrough; a nut arranged with a portion thereof located in and passing through said opening, said nut portion being of a slightly smaller size than said opening so as to permit tilting of said nut in all directions; means on said strip and nut for permitting only limited rotation of said nut about its axis; means for limiting the movement of said nut in one direction along its axis, said last-mentioned means comprising an enlargement on said nut which is of a larger size than said opening and said nut portion and which is located on one side of said strip; and flange means for limiting the movement of said nut in the other direction along its axis, said flange means being located on the side of said strip opposite to the side thereof on which said enlargement is located and being spaced from said enlargement by a distance which is slightly greater than the thickness of said strip so as to permit axial play of said nut, said flange means being of a larger size than said opening and having a surface confronting said strip and being substantially parallel to said strip; and adjustable connecting means located between said flange means and said nut for moving said flange means toward and away from said enlargement to adjust said axial play of said nut.

9. A device for facilitating the positioning of bolts in the assembly of constructional parts comprising, in combination, a strip to be secured to one of the parts to be assembled, said strip being formed with at least one opening passing therethrough; a nut arranged with a portion thereof located in and passing through said opening, said nut portion having a substantially straight outer surface which extends in a direction parallel to the longitudinal axis of the nut and said nut portion being of a slightly smaller size than said opening so as to permit tilting of said nut in all directions with respect to said strip; means on said strip and nut for permitting only limited rotation of said nut about its axis; means for limiting the movement of said nut in one direction along its axis, said last-mentioned means comprising an enlargement on said nut which is of a larger size than said opening and said nut portion and which is located on one side of said strip; and flange means for limiting the movement of said nut in the other direction along its axis, said flange means being located on the side of said strip opposite to the side thereof on which said enlargement is located and being spaced from said enlargement by a distance which is slightly greater than the thickness of said strip so as to permit axial play of said nut, said flange means being of a larger size than said opening and having a surface confronting said strip and being substantially parallel to said strip; and adjustable connecting means located between said flange means and said nut for moving said flange means toward and away from said enlargement so as to adjust said axial play of said nut.

EDMOND-PIERRE DESBRUÈRES.

REFERENCES CITED

The following references are of record in the file of this patent:

UNITED STATES PATENTS

| Number | Name | Date |
| --- | --- | --- |
| 1,570,148 | Herr | Jan. 19, 1926 |
| 1,579,875 | Lundberg | Apr. 6, 1926 |
| 1,694,580 | Carr | Dec. 11, 1928 |
| 1,822,845 | Pierce | Sept. 8, 1931 |
| 1,872,385 | Andrew | Aug. 16, 1932 |
| 2,146,128 | Oldham | Feb. 7, 1939 |
| 2,284,222 | Miller | May 26, 1942 |

FOREIGN PATENTS

| Number | Country | Date |
| --- | --- | --- |
| 536,553 | England | May 19, 1941 |